United States Patent Office 2,820,823
Patented Jan. 21, 1958

2,820,823

PROCESSES FOR THE CATALYTIC OXIDATION OF ACETONE

Edmond Bation, Saint-Fons, and Maximilien Grunfeld, Lyon, France, assignors to Societe des Usines Chimiques Rhone-Poulenc, Paris, France No Drawing. Application May 7, 1954
Serial No. 428,385

Claims priority, application Great Britain May 8, 1953

7 Claims. (Cl. 260—541)

This invention relates to the catalytic oxidation of acetone and more particularly to an improved process whereby increased yields of useful products are obtained.

It is known to oxidise acetone in the liquid phase by means of molecular oxygen in the presence of a catalyst to yield a mixture of acetic acid, formic acid and formaldehyde. The reaction may be envisaged as a breakdown of the acetone molecule, two of the carbon atoms of the acetone appearing in the products as acetic acid and the third appearing in the products as formic acid and formaldehyde. Carbon dioxide, carbon monoxide and water are also formed.

In one known process using a reaction vessel fitted with a reflux condenser, acetone is oxidised by introducing oxygen at elevated temperature into liquid acetone containing a manganese salt as catalyst. When the speed of absorption of the oxygen commences to decrease, a part of the liquid is withdrawn and replaced by fresh acetone containing catalyst. In this way, a mixture has been obtained containing 60% acetic acid, 30% formic acid, 5% formaldehyde and 5% water; more precisely, one kg. of the reaction product contains 10 g. mol acetic acid, 6.5 g. mol. formic acid, 1.65 g. mol. formaldehyde and 2.8 g. mol. water and an amount (equivalent to the weight of the water) of carbon dioxide and carbon monoxide. In this process, therefore, a considerable quantity of $CO_2$ and CO is formed.

In contradistinction to the prior known processes, the process of the present invention essentially comprises effecting the reaction under conditions, including that of temperature, such that escape of volatile reaction products from the reaction zone is at least unhindered and is preferably assisted by passage of gas under pressure upwardly through the reaction mixture. The gas may consist of relatively pure oxygen or oxygen diluted with one or more inert gases e. g. in the form of air or air supplemented by an additional quantity of nitrogen.

Under these conditions, the yield of acetic acid is practically the same as in the known processes, but the total yield of formic acid and formaldehyde is substantially increased at the expense of the more complete oxidation products, $CO_2$ and CO. The yield of formic acid alone is slightly less but this reduction in yield is largely compensated for by the increased yield of formaldehyde, for which there is a greater industrial demand.

In the process of the invention, the main, inter-dependant factors are the temperature of the reaction mixture and the velocity of the gas current at the exit of the reaction vessel. A temperature of at least 65° C. at normal pressure is required. The higher the reaction temperature the lower need be the velocity of the oxygen current through the reaction medium. In any event, it is necessary to maintain at the reactor exit a current of gas, residual unabsorbed oxygen, or nitrogen which, combined with the temperature, allows the vapours to escape.

According to a preferred feature of this invention, molecular oxygen and acetone are introduced into a heated liquid medium consisting wholly or partly of acetic acid and containing the catalyst which is preferably a salt of manganese. Elimination of the products of the reaction as they are formed and recovery of those required is conveniently achieved by effecting the reaction in a column or like reaction vessel equipped with controllable heating means and connected to a separate (non-reflux) condenser, in which the condensate is collected. The velocity of the current of oxygen, introduced at the base of the column, is such that, at the temperature employed, the volatiles are rapidly removed, partly by entrainment in the exit gas, from the reaction medium. Molecular oxygen is introduced at the base of the column and acetone is continuously introduced into the liquid contained in the column. Oxidation products, namely, acetic acid (in part), formic acid and formaldehyde, and the unchanged acetone, leave the column in vapour form, together with $CO_2$, CO, water vapour and excess oxygen. The liquid products are condensed in the condenser and fractionated in the usual manner.

The liquid in the column consists of the liquid products of the oxidation (principally acetic acid) and the acetone added during oxidation. It contains, for example, in solution, a manganese salt. The liquid is maintained at a constant level in the column by continuous addition of acetone. At the commencement of the operation, the column is charged with liquid originating from a previous operation or with acetic acid. It can be charged with acetone but acetic acid is preferred since it permits a higher oxidation temperature to be obtained. The temperature may vary between 65° C. and the boiling point of the least volatile substance in the system, i. e. acetic acid, under the conditions obtaining.

When operating at or in the neighbourhood of the higher end of the said temperature range, it is preferred to introduce acetic acid simultaneously with acetone into the column in order to maintain a constant level in the column. The process may be carried out above the normal boiling point of acetic acid by working under pressure. The molecular oxygen employed may be pure oxygen or may be diluted, e. g. in the form of air. In this latter case, however, it is preferable to operate under pressure. When operating with pressure using ordinary air a higher rate of oxidation is obtained but the yield, based on acetone, is smaller. It is advantageous to dilute the air with nitrogen.

The following examples will serve to illustrate the invention.

*Example I*

A column 65 cm. high and 50 mm. diameter and provided with a jacket for circulation of water or steam, is provided in its lower part with a plate of fritted glass. It is surmounted by two pouring funnels which discharge into a tube inside the column and it is connected to a condenser. The column is charged with the "foot" originating from an earlier operation and formed of 301 g. acetic acid, 95 g. formic acid, 8 g. formaldehyde and 141 g. acetone, to which has been added 10 g. manganese nitrate. Oxygen is introduced at the bottom of the column at the rate of 100 litres per hour. The temperature is raised to 90° C. and this temperature is then maintained by the jacketing system. As soon as the reaction has started, the distillation commences and there is simultaneously poured in, via the two funnels, 800 g. acetone and 138 g. acetic acid per hour, in proportion as the distillation progresses, while maintaining the level in the column constant.

After operating for 7½ hours, and after deducting the quantities of acetic acid, formic acid and formaldehyde which were introduced and unchanged acetone there are obtained:

Acetic acid _____ 680 g. (11.3 g. mol.)
Formic acid ____ 300 g. (6.5 g. mol.) } totalling
Formaldehyde __ 125 g. (4.15 g. mol.) } 10.65 g. mol.

Analysis of the outlet gases shows:

$CO_2$ _____ 32 g. (0.7 g. mol.)
CO _____ 11 g. (0.4 g. mol.)

totalling 1.1 g. mol., for an acetone consumption of 724 g. (12.5 g. mol.).

The yield (on the first two carbon atoms of the acetone) of acetic acid is thus 91%, the total yield of formic acid and formaldehyde (on the third carbon atom) is 85% and the respective yields of formic acid and formaldehyde are 52% and 33%.

The losses by formation of $CO_2$ and CO are only 8.8% calculated on the acetone which is used.

By way of comparison and in order to show the improvement achieved by the process according to the invention in relation to the known processes, there is described below a parallel process in which the oxidation products have not been removed as they are produced.

An analogous reaction vessel to that previously employed, is surmounted by a condenser working at total reflux, i. e. returning all the condensate into the reaction column. The withdrawal of products is effected in liquid form through the base of the column.

The column is charged with 1500 g. acetic acid, 550 g. acetone and 20 g. manganese nitrate. Oxygen is introduced at the rate of 100 litres per hour. The column is heated to 90° C. and then maintained at this temperature.

When the reaction has started, 110 g. acetone per hour are continuously poured into the top of the column and an equivalent quantity of liquid is drawn off at the bottom. A small quantity of manganese nitrate in acetone is added from time to time.

After operating for 48 hours, and after deducting the quantity of acetic acid introduced at the start, and the unchanged acetone, there was obtained:

Acetic acid _____ 2190 g.=36.5 g. mol. _____ 10 g. mol.
Formic acid _____ 1055 g.=22.9 g. mol. } 27.3 g.mol. { 6.3 g.mol.
Formaldehyde _____ 133 g.= 4.4 g. mol. }           { 1.2 g.mol.
$CO_2$ _____ 303 g.= 6.9 g. mol. } 9.9 g.mol. { _____
CO _____ 84 g.= 3 g. mol. }            { 2.7 g. mol.

for an acetone consumption of 2322 g.=40 g. mol.

In the last column given above, the figures are based on 10 g. mol. acetic acid in order to permit comparison with the prior known process to which reference is made earlier in this specification. It is to be observed that the yields obtained are in substantially the same relative proportions as in the known process.

The yields calculated on the acetone which is used are:

Acetic acid _____ 91.2%
Formic acid _____ 57.2% } 68.2%
Formaldehyde _____ 11%  }
$CO_2$ _____ 17.3% } 24.8%
CO _____ 7.5% }

If these results are compared with those obtained by eliminating the oxidation products as they are formed, it is found that the yield on acetic acid is practically the same in both cases, but, in the process according to the invention, the total yield of formic acid and formaldehyde has increased from 68.2% to 85%, and in particular that of formaldehyde has increased from 11% to 33%, while the losses by formation of $CO_2$ and CO have fallen from 24.8% to 8.8%.

*Example II*

In the same apparatus as used in Example I, the oxidation is carried out at 110° C. and 197 g. acetone and 350 g. acetic acid are introduced per hour, the other conditions remaining the same.

After operating for 14 hours, and after allowing for the quantities of acetic acid and formic acid which were introduced and the unchanged acetone, there are obtained:

Acetic acid _____ 980 g.=16.3 g. mol.
Formic acid _____ 361 g.=7.85 g. mol. }
Formaldehyde _____ 256 g.=8.55 g. mol. } 16.4 g. mol.
$CO_2$ _____ 64 g.=1.46 g. mol. }
CO _____ 19 g.=0.7 g. mol. } 2.16 g. mol.

for an acetone consumption of 1081 g.=18.6 g. mol.

The yield of acetic acid is thus 87.8%. The yields of formic acid and formaldehyde are respectively 42% and 46.2%. The total yield on the last carbon atom of the acetone is thus 88.2%. The losses by formation of $CO_2$ and CO are increased to 10.2% of the acetone which is used.

When this last process is compared with the comparative experiment described in Example I, in which the oxidation products have not been eliminated as they are formed, it is also found that the acetic acid yield is substantially the same, but that the total yield of formic acid plus formaldehyde is 88.2% as against 68.2% and the yield of formaldehyde alone is 46.2% as against 11%, and actually exceeds the yield of formic acid.

*Example III*

The reaction is carried out in a stainless steel vessel which withstands pressure and is formed of a tube 120 cm. high, 45 mm. diameter and surrounded by a double envelope to allow heating and cooling. The apparatus is equipped in the lower half with an air-entry which comprises a valve through which acetone mixed with acetic acid is introduced, with the aid of a regulating pump. The reactor leads to two condensers which can function under pressure, one being cooled by water and the other by brine. After passage through a pressure regulator the residual gases pass through washing apparatus to eliminate the remainder of the entrained volatile products.

In the reactor is charged:

| | G. |
|---|---|
| Acetic acid | 1160 |
| Acetone | 250 |
| Manganese nitrate | 14 |

The reactor is maintained at 89° C. and there is introduced air, 500 litres/hour (i. e. 105 litres of oxygen/hour) and nitrogen, 500 litres/hour, the pressure being maintained at 3.5 kg./cm.$^2$.

By means of the regulating pump is introduced:

| | G./hour |
|---|---|
| Acetone | 385 |
| Acetic acid | 190 |

The experiment is stopped after 14½ hours. There is obtained, after allowing for the acetic acid introduced and unchanged acetone, for a consumption of 1175 g. (20.25 g. mol.) of acetone:

Acetic acid _____ 1150 g.=19.2 g. mol.
Formic acid _____ 525 g.=11.4 g. mol. }
Formaldehyde _____ 174 g.=5.8 g. mol. } 17.2 g. mol.

Analysis of the gases obtained shows:

| | G. | mol. |
|---|---|---|
| $CO_2$ | 75 g.= | 1.7 |
| CO | 21 g.= | 0.75 |

The yield (on the first two carbon atoms of acetone) of acetic acid is therefore 95%. The total yield of formic acid and formaldehyde (on the third carbon atom) is 85% the respective yields of each being 56.5% and 28.5%.

Operating under the same conditions but using air undiluted with additional nitrogen there is obtained a yield of 45.8% of formic acid and 30.4% formaldehyde corresponding to a total yield on the third carbon atom of 76.4%.

We claim:

1. A process for the simultaneous preparation of acetic acid, formic acid, and formaldehyde which comprises passing oxygen at a temperature of at least 65° C. through liquid acetone containing a catalyst, and separating the whole of the acetic acid, formic acid and formaldehyde formed in gaseous form from the reaction medium continuously with their formation.

2. A process for the simultaneous preparation of acetic acid, formic acid and formaldehyde which comprises passing a mixture of oxygen and an inert gas at a temperature of at least 65° C. through liquid acetone containing a catalyst, and separating the whole of the acetic acid, formic acid and formaldehyde formed in gaseous form from the reaction medium continuously with their formation.

3. A process for the simultaneous preparation of acetic acid, formic acid and formaldehyde which comprises passing air under pressure and at a temperature of at least 65° C. through liquid acetone containing a catalyst, and separating the whole of the acetic acid, formic acid and formaldehyde formed in gaseous form from the reaction medium continuously with their formation.

4. A process for the simultaneous preparation of acetic acid, formic acid and formaldehyde which comprises passing nitrogen-enriched air under pressure at a temperature of at least 65° C. through liquid acetone containing a catalyst, and separating the whole of the acetic acid, formic acid and formaldehyde formed in gaseous form from the reaction medium continuously with their formation.

5. A process for the simultaneous preparation of acetic acid, formic acid and formaldehyde which comprises passing a stream of oxygen at a temperature of at least 65° C. through liquid acetone containing a catalyst, and separating the whole of the gaseous acetic acid, formic acid and formaldehyde formed from the reaction medium continuously with their production by entraining them in the said stream.

6. A process for the simultaneous preparation of acetic acid, formic acid and formaldehyde which comprises passing a stream of air at a temperature of at least 65° C. through liquid acetone containing a catalyst, and separating the whole of the gaseous acetic acid, formic acid and formaldehyde formed from the reaction medium continuously with their production by entraining them in the said stream.

7. A continuous process for the simultaneous preparation of acetic acid, formic acid and formaldehyde which comprises passing a stream of air at a temperature of at least 65° C. through liquid acetone containing acetic acid and a catalyst, entraining in the said stream the whole of the gaseous acetic acid, formic acid and formaldehyde formed, including acetic acid and unreacted acetone, and maintaining the volume of the liquid reaction medium substantially constant by the addition of acetone and acetic acid.

References Cited in the file of this patent
UNITED STATES PATENTS

| | | |
|---|---|---|
| 2,005,183 | Flemming et al. | June 18, 1935 |
| 2,299,013 | Flemming | Oct. 13, 1942 |